(12) United States Patent
Wang et al.

(10) Patent No.: US 7,526,781 B2
(45) Date of Patent: Apr. 28, 2009

(54) OPTICAL DISK APPARATUS WITH OBJECTIVE LENS PROTECTIVE UNIT

(75) Inventors: Ji-Seok Wang, Kyunggi-Do (KR); Chang-Suck Kim, Kyunggi-Do (KR); Jun-Sung Lee, Kyunggi-Do (KR)

(73) Assignee: Samsung Electro-Mechanics Co., Ltd, Kyinggi-Do (KR)

( * ) Notice: Subject to any disclaimer, the term of this patent is extended or adjusted under 35 U.S.C. 154(b) by 427 days.

(21) Appl. No.: 10/976,703

(22) Filed: Oct. 29, 2004

(65) Prior Publication Data

US 2006/0028928 A1 Feb. 9, 2006

(30) Foreign Application Priority Data

Jul. 22, 2004 (KR) ............. 10-2004-0057293

(51) Int. Cl.
*G11B 7/00* (2006.01)

(52) U.S. Cl. .................. 720/671; 369/44.14

(58) Field of Classification Search ............ 720/671
See application file for complete search history.

(56) References Cited

U.S. PATENT DOCUMENTS

| | | | |
|---|---|---|---|
| 5,150,338 A | * | 9/1992 | Birecki et al. ............ 369/13.13 |
| 5,615,196 A | * | 3/1997 | Kato ......................... 369/71 |
| 6,430,143 B1 | * | 8/2002 | Kajiyama et al. .......... 720/671 |
| 6,445,674 B1 | * | 9/2002 | Morita ....................... 720/671 |
| 7,103,895 B2 | * | 9/2006 | Osada et al. ................ 720/671 |

FOREIGN PATENT DOCUMENTS

| | | |
|---|---|---|
| JP | 06131682 A | 5/1994 |
| JP | H06-52017 | 5/1994 |
| JP | 08-022633 | 1/1996 |
| JP | 10-049895 | 2/1998 |
| JP | 2001-014709 | 1/2001 |
| JP | 2003030881 | 1/2003 |

* cited by examiner

*Primary Examiner*—Wayne R Young
*Assistant Examiner*—Adam R Giesy
(74) *Attorney, Agent, or Firm*—Gottlieb, Rackman & Reisman, P.C.

(57) ABSTRACT

The present invention provides an optical disk apparatus which has a cover to cover and uncover an objective lens provided in an optical pickup, thus preventing the objective lens from being contaminated with dust, etc. The optical disk apparatus includes an optical pickup conveying a cover conveying body, and a cover body which actuates the cover. The optical disk apparatus further includes an objective lens protective unit comprising a rack and pinion assembly for operating the cover In the optical disk apparatus of the present invention, the objective lens protective unit is operated by a rotation of the drive motor to move the cover, thus covering and uncovering the objective lens. Therefore, the objective lens is efficiently protected from outside dust.

18 Claims, 6 Drawing Sheets

OPTICAL DISK APPARATUS WITH OBJECTIVE LENS PROTECTIVE UNIT

BACKGROUND OF THE INVENTION

1. Field of the Invention

The present invention relates generally to optical disk apparatuses, and more particularly, to an optical disk apparatus which has a cover to cover and uncover an objective lens provided in an optical pickup, thus preventing the objective lens from being contaminated with dust, etc.

2. Description of the Related Art

As well known to those skilled in the art, optical disks are used as a medium to record information and to reproduce the recorded information. The optical disks allow information to be recorded onto and to be reproduced from the optical disks without being in contact with separate heads for recording and reproducing the information. Furthermore, the optical disks have high recording density. Generally, recorded information on the optical disks is read and reproduced by optical disk apparatuses.

Typically, the conventional optical disk apparatuses each include a turntable to seat an optical disk thereon, and a spindle motor to rotate the turntable. The optical disk apparatus further includes an optical pickup with an objective lens, and an actuating unit to reciprocate the optical pickup in a radial direction of the optical disk. It is very important to protect the objective lens, which directly irradiates light on a surface of the optical disk, on which the information is recorded, from outside contaminants, such as dust.

If a contaminant, such as dust, is smeared on the objective lens, the performance of the objective lens may be deteriorated. In addition, if the objective lens were contaminated, the optical disk may become illegible. Furthermore, when information is recorded onto the optical disk using the objective lens contaminated, the recording property of the optical disk may be deteriorated. Particularly, to use the optical disk apparatus in a place in which dust is excessively generated, for example, a desert region, such as the Middle East, or an industrial floor in which excessive fly dust is generated, a dust protective means must be provided in the optical disk apparatus to protect the objective lens from the dust.

To achieve the above-mentioned purpose, several optical disk apparatuses having structures to protect outer surfaces of objective lenses from dusts were proposed and have been used. Representative examples of the conventional optical disk apparatuses will be described herein below, with reference to the drawings.

FIG. 1 is a view showing an example of the conventional optical disk apparatuses. As shown in FIG. 1, a conventional optical disk apparatus includes a turntable 22 to place an optical disk 10 thereon, and a spindle motor 20 which is coupled to the turntable 22. The optical disk apparatus further includes an optical pickup 30 which is provided around the spindle motor 20 and is supported by a guide 42. The optical pickup 30 reciprocates in a radial direction of the optical disk 10 which is shown by the arrow (B) in FIG. 1. The optical disk apparatus further includes an optical pickup actuating unit 40 to actuate the optical pickup 30. The optical disk apparatus further includes a body cover 70 which is rotated around a hinge shaft 72 in directions shown in the arrow (A) in FIG. 1. The optical disk apparatus further includes a locking unit 74 and a control unit 50 which is coupled to the optical pickup actuating unit 40.

In the conventional optical disk apparatus, the body cover 70 is rotated to open an upper portion of the optical disk apparatus. Thereafter, the optical disk 10 is placed onto or removed from the turntable 22 through the opened upper portion of the optical disk apparatus. When the optical disk 10 is placed onto the turntable 22, the optical pickup 30 with an objective lens 32 moves to a position, on which a sensor 44 is provided, to wait under a lens cover 60. In other words, in a state in which the optical disk 10 is not mounted onto the turntable 22, the optical pickup 30 is placed under the lens cover 60. Therefore, the objective lens 32 is protected by the lens cover 60 from contamination such as dust.

However, in the conventional optical disk apparatus, the lens cover 60 must be additionally provided in the optical disk apparatus to have the above-mentioned structure. Accordingly, the optical disk apparatus must be increased in size to receive the lens cover 60 therein. In a detailed description, the optical disk apparatus is designed such that the optical pickup reciprocates in an additional region, on which the lens cover 60 is provided, as well as a region having a predetermined area to correspond to a diameter of the optical disk. Therefore, the optical disk apparatus is disadvantageous in that its size is increased.

FIG. 2 is a perspective view showing another example of optical pickup of the conventional optical disk apparatuses. As shown in FIG. 2, a conventional optical pickup 130 includes an optical pickup body 134 and an actuator 180 which is provided on the optical pickup body 134, with an objective lens 132 provided in the actuator 180. The optical pickup 130 further includes a cover 160 which is actuated on the actuator 180 by a cover actuating means 162.

In the conventional optical pickup 130 having the above-mentioned construction, the cover 160 covers the objective lens 132 and is removed from the objective lens 132. The above-mentioned operation of the cover 160 protects the objective lens 132 from dust. Furthermore, a fine cleaning means (not shown), such as fine wool, may be provided under the cover 160 to clean the surface of the objective lens 132.

However, to provide the above-mentioned structure, the conventional optical pickup 130 must have the additional cover actuating means 162 to actuate the cover 160, as shown in FIG. 2. Therefore, the optical pickup body 134 including the cover actuating means 162 is increased in size.

As described above, each of the structures adapted for the conventional optical disk apparatus and the conventional optical pickup protects the objective lens from dust, but is problematic in that its size must be increased to achieve the above-mentioned purpose. Furthermore, in the case of the optical disk apparatus shown in FIG. 1, a gap exists between the lens cover 60 and the objective lens 32. Accordingly, the optical disk apparatus is problematic in that the objective lens 32 is not completely protected from dust.

SUMMARY OF THE INVENTION

Accordingly, the present invention has been made keeping in mind the above problems occurring in the prior art, and an object of the present invention is to provide an optical disk apparatus which has a dust protective means to protect an objective lens of an optical pickup from outside dust.

Another object of the present invention is to provide an optical disk apparatus in which the dust protective means is provided without an increase in size of the optical disk apparatus.

In order to accomplish the above object, the present invention provides an optical disk apparatus, including: a deck, with a central hole provided on a central portion of the deck, and a pair of guide shafts provided on the deck on opposite sides of the central hole; a spindle motor provided at a predetermined position on the deck and coupled to a turntable on which an optical disk is placed; an optical pickup movably supported at opposite sides thereof by the pair of guide shafts, with an objective lens provided in the optical pickup; and an optical pickup actuating unit to reciprocate the optical pickup in a radial direction of the optical disk, and having a drive motor provided on the deck on a predetermined side of the central hole, and an optical pickup conveying body coupled at a first surface thereof to the optical pickup and coupled at a second surface thereof to the drive motor through a gear train. The optical disk apparatus further includes an objective lens protective unit, having a cover to cover the objective lens and reciprocate by the drive motor in a direction crossing the pair of guide shafts, thus covering and uncovering the objective lens.

The objective lens protective unit may have a cover conveying body to reciprocate in the radial direction of the optical disk in conjunction with the optical pickup conveying body; a cover body to reciprocate in the direction crossing the pair of guide shafts according to the reciprocating motion of the cover conveying body, with the cover protruded from an end of the cover body; and a power transmission means to convert the reciprocating motion of the cover conveying body into the reciprocating motion of the cover body. The conversion of the reciprocating motion of the cover conveying body into the reciprocating motion of the cover body is executed in a state such that the optical pickup is stopped at a predetermined position.

The predetermined position at which the optical pickup is stopped may be a waiting position at which the optical pickup is placed when the optical disk is placed onto or removed from the turntable.

The power transmission means may have a power transmission shaft comprising at least one pinion gear; and a rack provided on each of the cover conveying body and the cover body to engage with the power transmission shaft.

The power transmission shaft may be supported on the optical pickup in a direction perpendicular to a surface of the optical disk, and the racks of the cover conveying body and the cover body may engage with the power transmission shaft at different positions on the power transmission shaft.

The power transmission shaft may have two pinion gears which have different diameters and are layered on top of another, so that a moving distance of the cover conveying body is different from a moving distance of the cover body. The moving distance of the cover body may be larger than the moving distance of the cover conveying body.

The optical disk apparatus may further include a rack provided on a side of the optical pickup conveying body to engage with the gear train; and another rack provided on a side of the cover conveying body opposite the rack engaging with the power transmission shaft to engage with the gear train.

The racks of the cover conveying body and the optical pickup conveying body which correspond to the gear train may have different lengths, and the cover conveying body and the optical pickup conveying body may be operated in conjunction with each other by coupling means comprising a protrusion and a slot.

The rack of the cover conveying body corresponding to the gear train may be longer than the rack of the optical pickup conveying body by a predetermined length, and while the optical pickup is placed at the waiting position, the cover conveying body may be actuated alone by the gear train, and thereafter, the optical pickup conveying body may be actuated along with the cover conveying body by the coupling means.

The rack of the cover conveying body corresponding to the power transmission shaft may have a predetermined length and be provided at a predetermined position to correspond to the predetermined length by which the rack of the cover conveying body corresponding to the gear train is longer than the rack of the optical pickup conveying body.

BRIEF DESCRIPTION OF THE DRAWINGS

The above and other objects, features and other advantages of the present invention will be more clearly understood from the following detailed description taken in conjunction with the accompanying drawings, in which:

FIGS. 5a and 5b are perspective views showing a reciprocating motion of a cover body of the optical disk apparatus of FIG. 3, wherein:

FIG. 5a is a perspective view showing a state such that the cover covers an objective lens; and FIG. 5b is perspective view showing a state such that the objective lens is exposed to the outside while the cover 262 is opened

DESCRIPTION OF THE PREFERRED EMBODIMENTS

Figure 1:
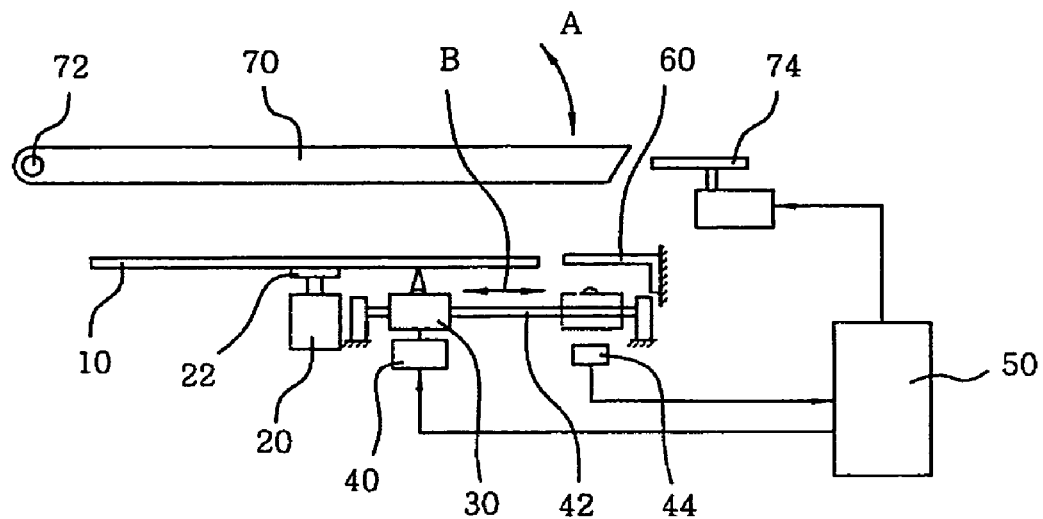
FIG. 1 is a view showing an example of conventional optical disk apparatuses.
Figure 2:
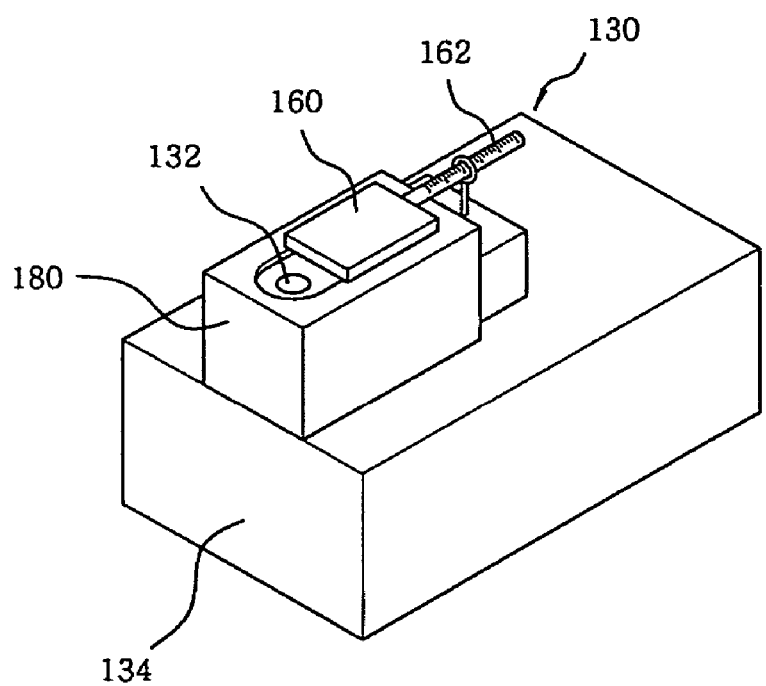
FIG. 2 is a perspective view showing another example of optical pickup of the conventional optical disk apparatuses.

Hereinafter, embodiments of the present invention will be described in detail with reference to the attached drawings. Reference now should be made to the drawings, in which the same reference numerals are used throughout the different drawings to designate the same or similar components.

Figure 3:
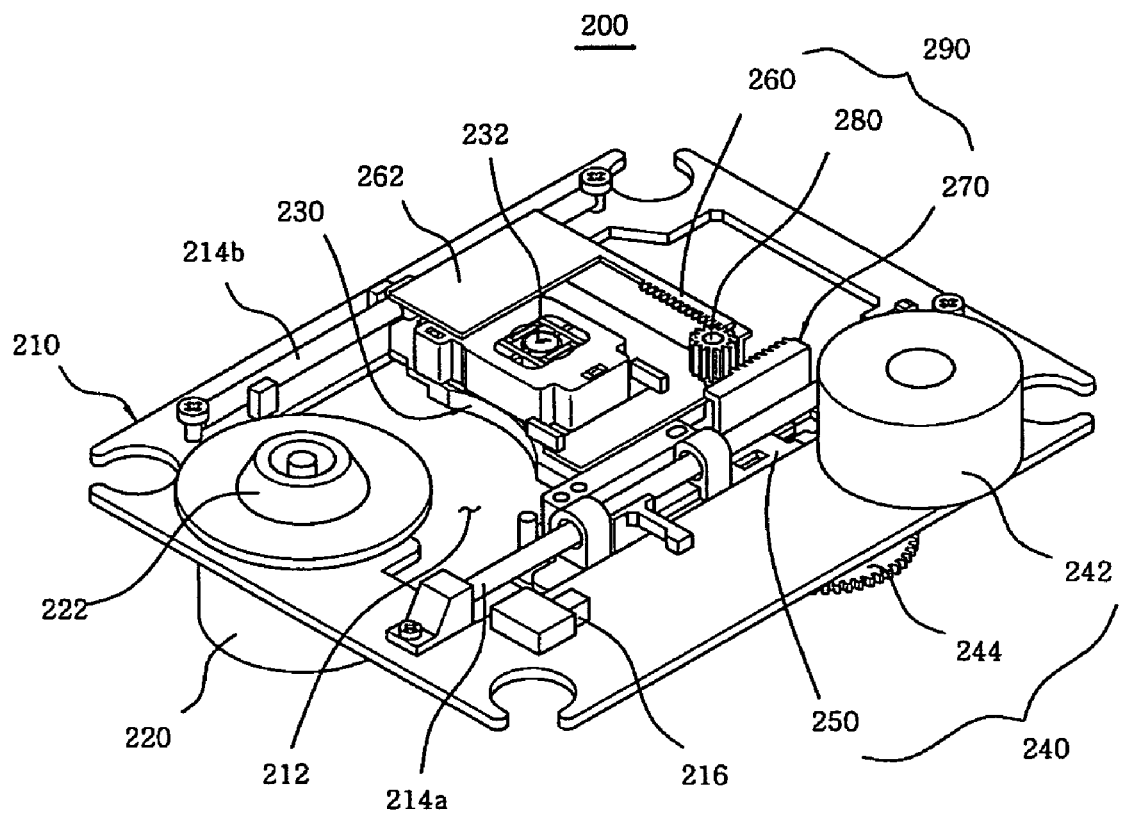
FIG. 3 is a perspective view of an optical disk apparatus, according to a first embodiment of the present invention.
Figure 4:
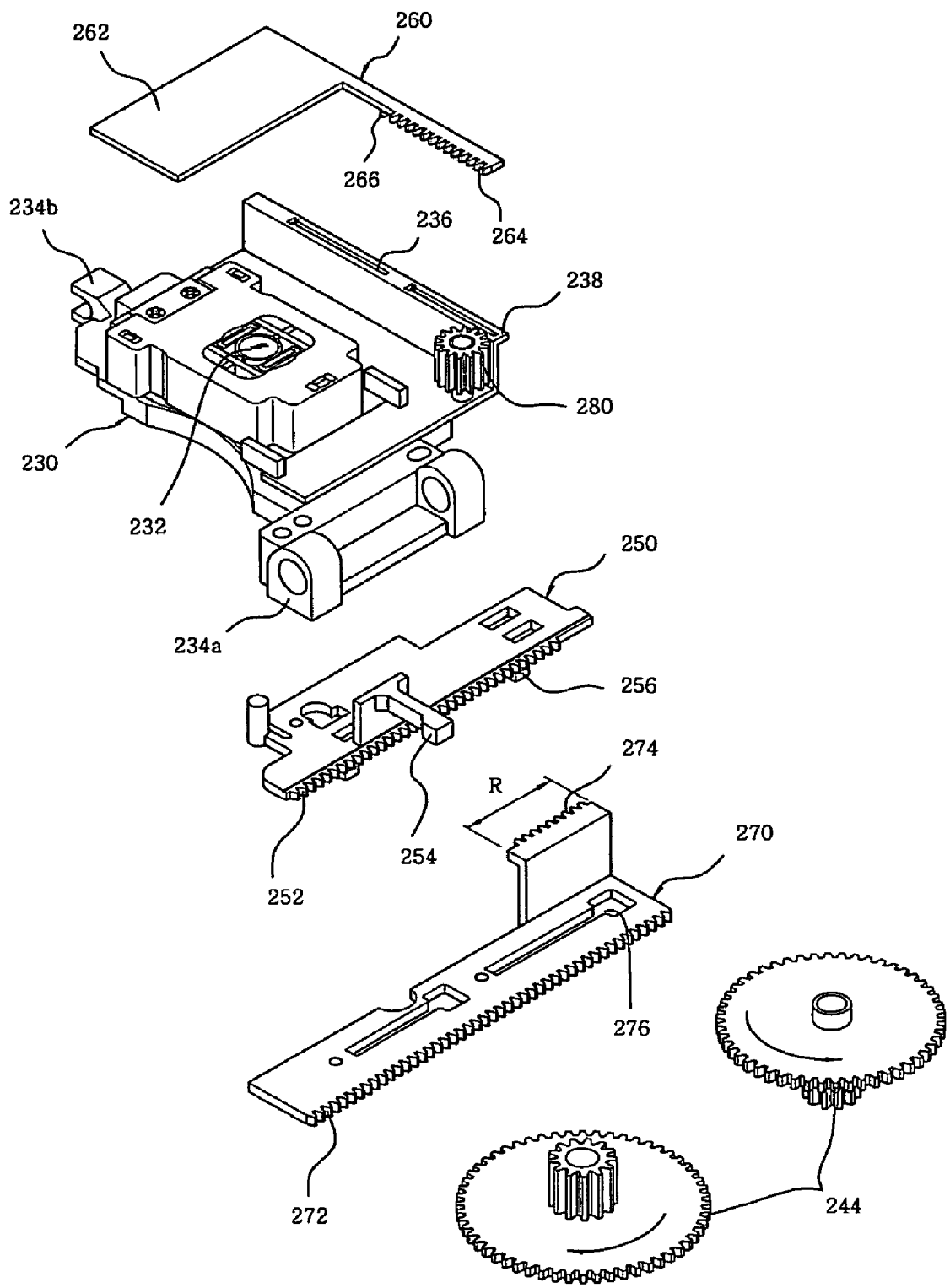
FIG. 4 is an exploded perspective view of the optical disk apparatus of FIG. 3.

FIG. 3 is a perspective view of an optical disk apparatus 200, according to a first embodiment of the present invention. FIG. 4 is an exploded perspective view of the optical disk apparatus 200 of FIG. 3. A construction of the optical disk apparatus 200 according to the first embodiment of the present invention will be described herein below, with reference to FIGS. 3 and 4.

As shown in FIGS. 3 and 4, the optical disk apparatus 200 of the present invention includes a deck 210, a spindle motor 220, an optical pickup 230 and an optical pickup actuating unit 240. The optical disk apparatus 200 further includes an objective lens protective unit 290 which is a special feature of the present invention.

The deck 210 has a central hole 212 which is provided on a central portion of the deck 210. A pair of guide shafts 214a and 214b is provided on opposite sides of the central hole 212 of the deck 210. The spindle motor 220 is provided at a predetermined position on the deck 210 where the guide shafts 214a and 214b are not located. A turntable 222 is coupled to a rotating shaft of the spindle motor 220 to place an optical disk (not shown) thereon. The optical disk, placed on the turntable 222, is rotated along with the turntable 222 by the operation of the spindle motor 220.

The optical pickup 230 is supported on the pair of guide shafts 214a and 214b. The optical pickup 230 reciprocates within a range defined by the central hole 212 of the deck 210 in a radial direction of the optical disk. An objective lens 232 is provided on an upper portion of the optical pickup 230. First and second support units 234a and 234b protrude from the optical pickup 230 toward the pair of guide shafts 214a and 214b to correspond to the guide shafts 214a and 214b, respectively. The first and second support units 234a and 234b slide along the guide shafts 214a and 214b, so as to allow the optical pickup 230 to reciprocate in the radial direction of the optical disk.

The optical pickup actuating unit 240 includes a drive motor 242 which is provided on the deck 210 on a predetermined side of the central hole 210, and a gear train 244 which is coupled to a rotating shaft of the drive motor 242. The optical pickup actuating unit 240 further includes an optical pickup conveying body 250, with a rack 252 provided on the optical pickup conveying body 250 to engage with the gear train 244. Preferably, the optical pickup conveying body 250 is directly attached at a side thereof opposite the rack 252 to a lower portion of the optical pickup 230. When the drive motor 242 is rotated, the gear train 244, coupled to the rotating shaft of the drive motor 242, is rotated (see, the arrows shown in FIG. 4). Then, the optical pickup conveying body 250 having the rack 252, which engages with the gear train 244, slides along the guide shaft 214a. Thus, the optical pickup 230 can reciprocate along with the optical pickup conveying body 250.

The objective lens protective unit 290 includes a cover 262 to cover and uncover the objective lens 232 of the optical pickup 230. The cover 262 has a plate shape and protrudes from an end of a cover body 260 which reciprocates in a direction crossing the pair of guide shafts 214a and 214b. By the reciprocating motion of the cover body 260, the objective lens 232 is covered and uncovered.

In the first embodiment of the present invention, the objective lens protective unit 290 is actuated by the drive motor 242 of the optical pickup actuating unit 240. The construction and operation of the objective lens protective unit 290 will be described herein below.

The objective lens protective unit 290 further includes a cover conveying body 270 that reciprocates in the radial direction of the optical disk in conjunction with the optical pickup conveying body 250. The objective lens protective unit 290 further includes the cover body 260 that reciprocates along with the cover 262 in the direction crossing the pair of guide shafts 214a and 214b. The objective lens protective unit 290 further includes a power transmission means to convert the reciprocating motion of the cover conveying body 270 into the reciprocating motion of the cover body 260. The conversion of the reciprocating motion of the cover conveying body 270 into the reciprocating motion of the cover body 260 is executed in a state in which the optical pickup 230 is stopped at a predetermined position. The power transmission means has a power transmission shaft comprising at least one pinion gear 280. The power transmission means further has racks 264, 274 which are provided on each of the cover body 260 and the cover conveying body 270 to engage with the power transmission shaft.

The predetermined position, at which the optical pickup 230 is stopped, is a waiting position at which the optical pickup 230 is placed when the optical disk is placed onto or removed from the turntable 222. Preferably, the predetermined position at which the optical pickup 230 is stopped is a position at which the optical pickup 230 is closest to the turntable 222 during the reciprocating motion of the optical pickup 230.

The cover conveying body 270 has a rack 272 (hereinafter, referred to as a first rack) which is provided on a side of the optical pickup conveying body 270 corresponding to the rack 252 of the optical pickup conveying body 250, thus engaging with the gear train 244. Therefore, the cover conveying body 270 reciprocates by rotation of the drive motor 242. The rack 274 (hereinafter, referred to as a second rack) extends upwards from a side of the cover conveying body 270 opposite the first rack 272 and is bent outwards at an end thereof. The second rack 274 engages with the pinion gear 280 which is the power transmission means.

In the cover conveying body 270, there is a difference in height between the first rack 272 and the second rack 274 by a length of a part of the second rack 274 extending upwards from the cover conveying body 270. This difference in height between the first rack 272 and the second rack 274 is caused by a difference in height between the gear train 244 engaging with the first rack 272 and the pinion gear 280 which is the power transmission shaft and engages with the second rack 274. The second rack 274 has a predetermined length (R). The predetermined length (R) of the second rack 274 is the same as the portion of the first rack 272 within which the cover conveying body 270 is independent from the optical pickup conveying body 250. In other words, the first rack 272 of the cover conveying body 270 is longer than the rack 252 of the optical pickup conveying body 250 by the predetermined length (R). As a result, when the first rack 272 of the cover conveying body 270 begins to move, only the cover body 260 is actuated along with the cover conveying body 270 without any motion of the optical pickup conveying body 250.

The cover conveying body 270 and the optical pickup conveying body 250 are operated in conjunction with each other by a coupling means comprising a first protrusion 256 and a first slot 276. The cover conveying body 270 is supported on the optical pickup conveying body 250 by a first protrusion 256 inserted in the first slot 276 and bent at its end so as to remain inserted in the first slot 276. In the optical disk apparatus 200 of the present invention, the first protrusion 256 and the first slot 276 are provided on the optical pickup conveying body 250 and the cover conveying body 270, respectively, as shown in FIG. 4. However, in contrast to the above-mentioned construction, the optical pickup conveying body 250 may have a slot and the cover conveying body 270 may have a protrusion, respectively.

The pinion gear 280 is supported on a predetermined portion of the optical pickup 230. The second rack 274 of the cover conveying body 270 and the rack 264 of the cover body 260 engage with the pinion gear 280 at different positions on the pinion gear 280. The second rack 274 of the cover conveying body 270 and the rack 264 of the cover body 260 are arranged to be parallel to each other, and are actuated in the radial direction of the optical disk and in the direction crossing the guide shafts 214a and 214b, respectively. That is, the actuating directions of the second rack 274 of the cover conveying body 270 and the rack 264 of the cover body 260 are perpendicular to each other.

The cover body 260 is actuated in a slide-type movement on a support 238 which vertically extends from a predetermined portion of the optical pickup 230 prior to being bent at an end thereof outwards. The cover body 260 is supported on the support 238 by a second protrusion 266 and a second slot 236. The second protrusion 266 vertically protrudes from a lower surface of the cover body 260. The second slot 236 is provided on a surface of the support 238. Thus, the second protrusion 266 is inserted into the second slot 236 to allow the cover body 260 to be supported and slide on the support 238. The rack 264 of the cover body 260 engages with the pinion gear 280 which is the power transmission shaft. Therefore, the cover body 260 reciprocates in the direction crossing the guide shafts 214a and 214b according to the rotation of the pinion gear 280. Thus, the cover 262 covers and uncovers the objective lens 232.

Figure 5A:
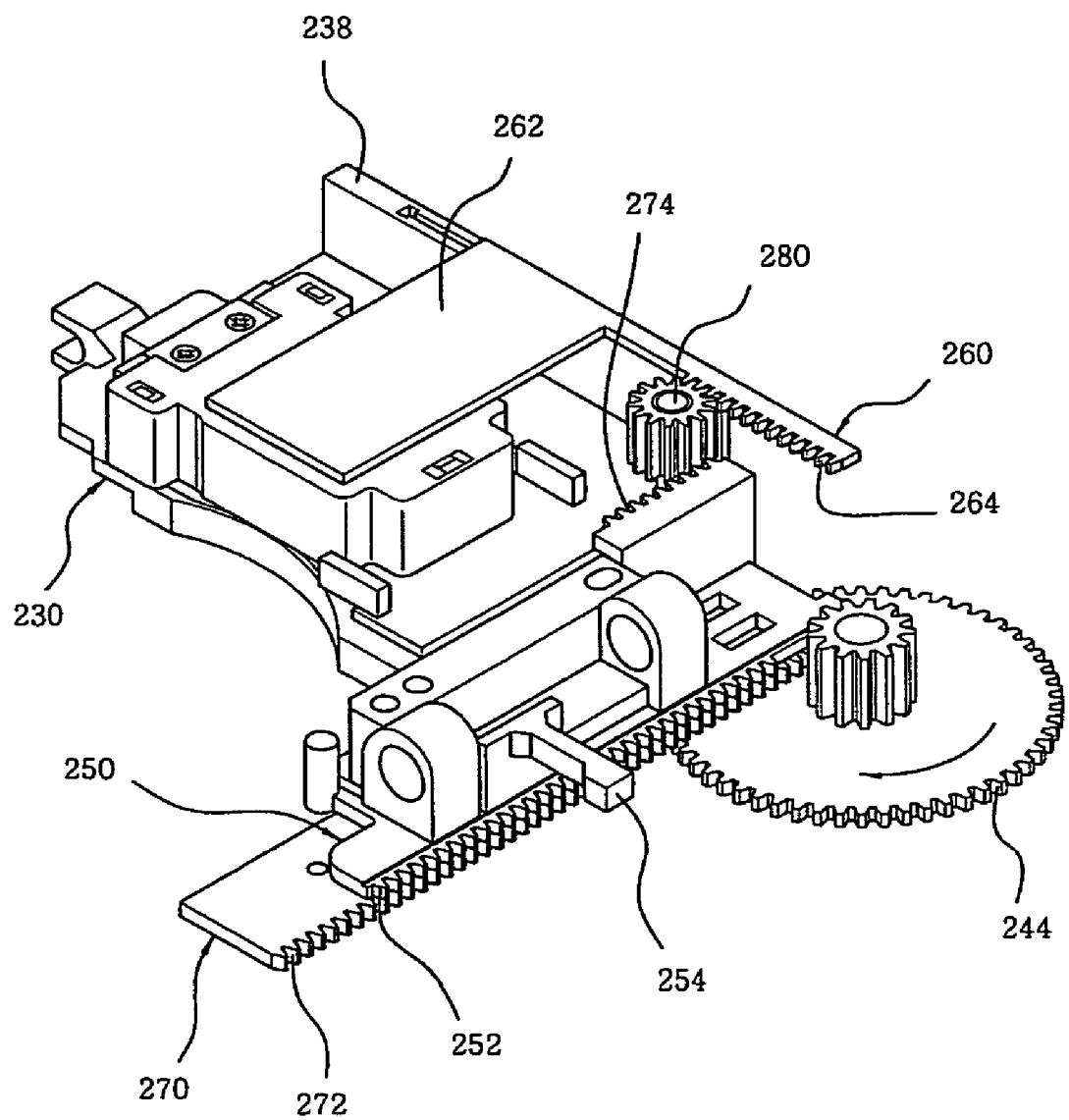
Figure 5B:
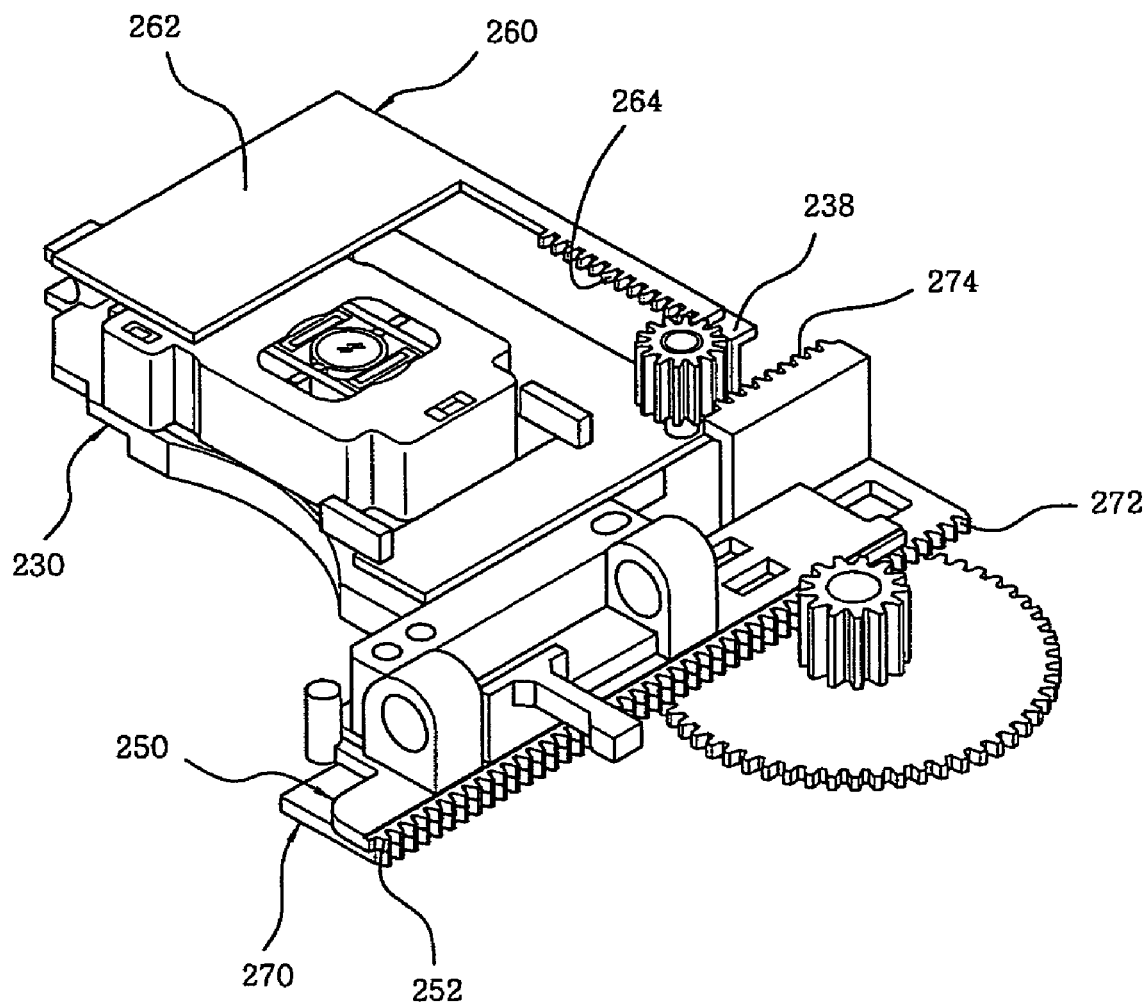

The operation of the objective lens protective unit 290 of the optical disk apparatus 200 of the present invention will be described herein below, with reference to FIGS. 5a and 5b. FIG. 5a is a perspective view showing the operation of the objective lens protective unit 290, in which the cover 262 covers the objective lens 232 while the optical pickup 230 is stopped at the waiting position. FIG. 5b is a perspective view showing a state such that the objective lens 232 is exposed to the outside while the cover 262 is opened.

Referring to FIGS. 5a and 5b, in an early stage of a starting operation of the optical disk apparatus 200, the rack 252 of the optical pickup conveying body 250 does not engage with the gear train 244, but only the first rack 272 of the cover conveying body 270 is actuated while engaging with the gear train 244. In a detailed description, after an optical disk is placed on the turntable 222, the drive motor 242 is operated. Then, the cover conveying body 270 and the optical pickup conveying body 250 start to move at a predetermined time interval. In the present invention, the first rack 272 of the cover conveying body 270 is moved first, and thereafter, the optical pickup conveying body 250 is actuated along with the cover conveying body 270 by the coupling means. The above-mentioned operation is obtained by the difference of the positions at which the first rack 272 and the rack 252 are provided on the cover conveying body 270 and the optical pickup conveying body 250, respectively.

In the meantime, while the first rack 272 of the cover conveying body 270 is moved, the second rack 274 along with the first rack 272 is also moved to rotate the pinion gear 280 which is the power transmission means and engages with the second rack 274. Thus, the rack 264 of the cover body 260, which engages with the pinion gear 280 at the predetermined height different from that of the second rack 274, is moved. At this time, the rack 264 of the cover body 260 is moved through the pinion gear 280 by a moving distance of the second rack 274 of the cover conveying body 270. That is, as shown in FIG. 5b, the rack 264 of the cover body 260 is moved along the support 238 by the moving distance of the second rack 274 of the cover conveying body 270 while the second rack 274 is moved rightwards based on the pinion gear 280. As a result, the cover 262 is moved to expose the objective lens 232 to the outside.

After the objective lens 232 is exposed from the cover 262 to the outside, the cover conveying body 270 and the optical pickup conveying body 250 are operated in conjunction with each other. Therefore, the optical pickup 230 can reciprocate in the state of being exposed to the outside. The operation of the cover conveying body 270 and the optical pickup conveying body 250 in conjunction with each other is obtained by the coupling means comprising the first protrusion 256 and the first slot 276, as follows in detail.

The coupling means has a function to couple the cover conveying body 270 to the optical pickup conveying body 250 such that the cover conveying body 270 is supported by the optical pickup conveying body 250. When the cover conveying body 270 is moved to a predetermined distance which is the predetermined length (R) shown in FIG. 4, a stop part of the first slot 276 of the cover conveying body 270 comes into contact with the first protrusion 256 of the optical pickup conveying body 250. Thus, the optical pickup conveying body 250 with the first protrusion 256 is moved along with the cover conveying body 270.

In a detailed description, in the early stage of the operation of the drive motor 242, the rack 252 of the optical pickup conveying body 250 does not engage with the gear train 244. Thus, only the cover conveying body 270 slides under the optical pickup conveying body 250. When the stop part of the first slot 276 of the cover conveying body 270 comes into contact with the first protrusion 256 of the optical pickup conveying body 250 during the slide motion of the cover conveying body 270, the optical pickup conveying body 250 begins to move along with the cover conveying body 270. Simultaneously, the rack 252 of the optical pickup conveying body 250 engages with the gear train 244.

When the rack 252 of the optical pickup conveying body 250 engages with the gear train 244, the rack 252 of the optical pickup conveying body 250 is moved along with the first rack 272 of the cover conveying body 270. Thus, the optical pickup conveying body 250 becomes capable of reciprocating along with the cover conveying body 270 in the radial direction of the optical disk according to the rotation of the gear train 244. While the optical pickup conveying body 250 and the cover conveying body 270 are operated in conjunction with each other, the second rack 274 of the cover conveying body 270 does not engage with the pinion gear 280. Therefore, the pinion gear 280 is stopped, so that the cover 262 is maintained at a predetermined side of the optical pickup 230 to expose the objective lens 232 to the outside.

In a stopping operation of the optical disk apparatus 200, the optical disk apparatus 200 is operated in reverse, with respect to the above-mentioned starting operation of the optical disk apparatus 200. In detail, when the optical pickup 230 is moved to the waiting position at which the optical pickup 230 is closest to the turntable 222, a horizontal protrusion 254, provided on the optical pickup conveying body 250, comes into contact with a stopper 216 which is provided on the deck 210 (see, FIG. 3). Then, the optical pickup conveying body 250 is stopped. Only the cover conveying body 270 is operated while engaging with the gear train 244 in the stopped state of the optical pickup conveying body 250. When the optical pickup conveying body 250 is stopped, the optical pickup 230 is also stopped, so that a positional movement of the pinion gear 280 is stopped. At this time, the cover conveying body 270 is still operated to convert the motion of the second rack 274 of the cover conveying body 270 into the motion of the rack 264 of the cover body 260 through the pinion gear 280. As a result, the cover 262 moves to a position right above the objective lens 232, thus protecting the objective lens 232.

Figure 6:
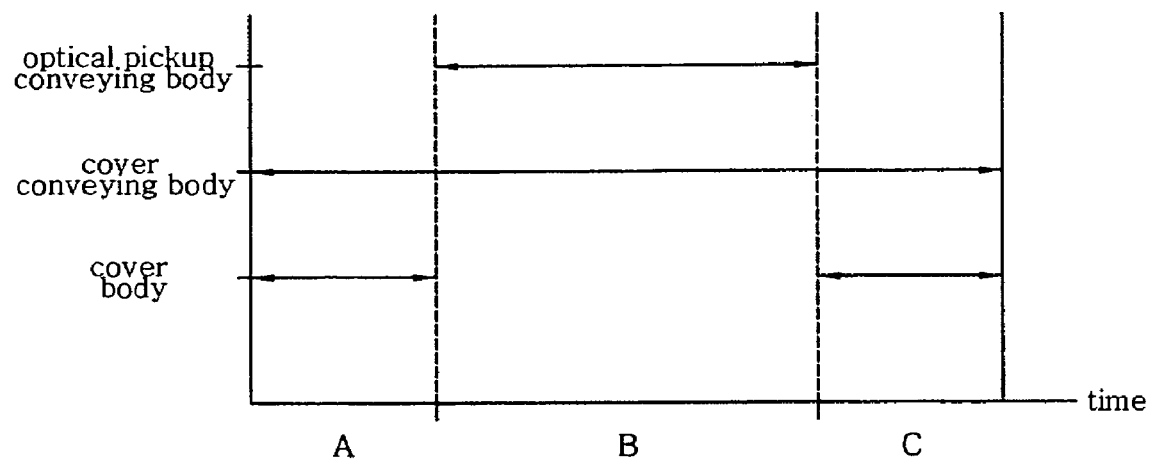
FIG. 6 is a graph comparatively showing action times of an optical pickup conveying body, a cover conveying body and a cover body of the optical disk apparatus of FIG. 3.

As described above, the reciprocating motion of the cover 262 is executed in only the state such that the optical pickup 230 is placed at the waiting position. FIG. 6 is a graph comparatively showing action times of the optical pickup conveying body 250, the cover conveying body 270 and the cover body 260. The operation of the above-mentioned elements is as follows with reference to FIG. 6.

FIG. 6 shows the action times of the significant three elements (the optical pickup conveying body 250, the cover conveying body 270 and the cover body 260) which are operated to actuate the objective lens protective unit 290, with the passage of time.

Referring to FIG. 6, a section, that is designated by the reference character 'A', means the early stage of the operation of the drive motor 242. In the section 'A', the cover 262 moves to uncover the objective lens 232. In addition, the cover conveying body 270 and the cover body 260 are operated, but the optical pickup conveying body 250 is maintained in a stopped state. In detail, the optical pickup conveying body 250 does not move, so that the pinion gear 280, provided at a predetermined position on the optical pickup 230, is placed at one position. Both the second rack 272 of the cover conveying body 270 and the rack 264 of the cover body 260 are operated based on the pinion gear 280, which is placed at one position, while engaging with the pinion gear 280. As a result, the cover 262 is removed from the objective lens 232 to expose the objective lens 232 to the outside.

Second, a section, that is designated by the reference character 'B', means a period during which information is recorded onto or reproduced from the optical disk using the optical pickup 230. In the section 'B', the cover conveying body 270 and the optical pickup conveying body 250 are operated in conjunction with each other while the cover body 260 is stopped. In a detailed description, the optical pickup conveying body 250 is operated along with the cover conveying body 270, so that the optical pickup 230 moves by the operation of the optical pickup conveying body 250. Therefore, both the pinion gear 280, supported on the optical pickup 230, and the second rack 274 of the cover conveying body 270 have positional movements. As such, the pinion gear 280 and the second rack 274 move together, so that the positional movement of the second rack 274 is not transmitted to the cover body 260. Therefore, the cover 262 is maintained in an open state.

Lastly, a section, that is designated by the reference character 'C', means a period of the stopping operation of the optical disk apparatus 200. In the section 'C', the cover conveying body 270 and the cover body 260 are operated together while the optical pickup conveying body 250 is stopped. In a detailed description, the optical pickup 230 moves to the waiting position until being stopped by the stopper 216. The positional movement of the pinion gear 280, supported on the optical pickup 230, is also stopped. At this time, the second rack 274 of the cover conveying body 270, which is continuously operated, engages with the pinion gear 280. Therefore, the rack 264 of the cover body 260, which engages with the pinion gear 280, is operated to cover the objective lens 232.

As described above, the special feature of the optical disk apparatus 200 of the present invention is that the objective lens 232 is covered and uncovered by the above-mentioned operation of the cover 262. To achieve the above-mentioned purpose, the optical disk apparatus 200 includes the optical pickup conveying body 250 to actuate the optical pickup 230. The optical disk apparatus 200 further includes the cover conveying body 270 which actuates the cover 262 by transmitting the reciprocating movement to the cover body 260 through the pinion gear 280, and the cover body 260 which directly actuates the cover 262.

Furthermore, the movements of the above-mentioned elements are relatively executed as shown in FIG. 6, thus obtaining the purpose of the present invention.

Figure 7:
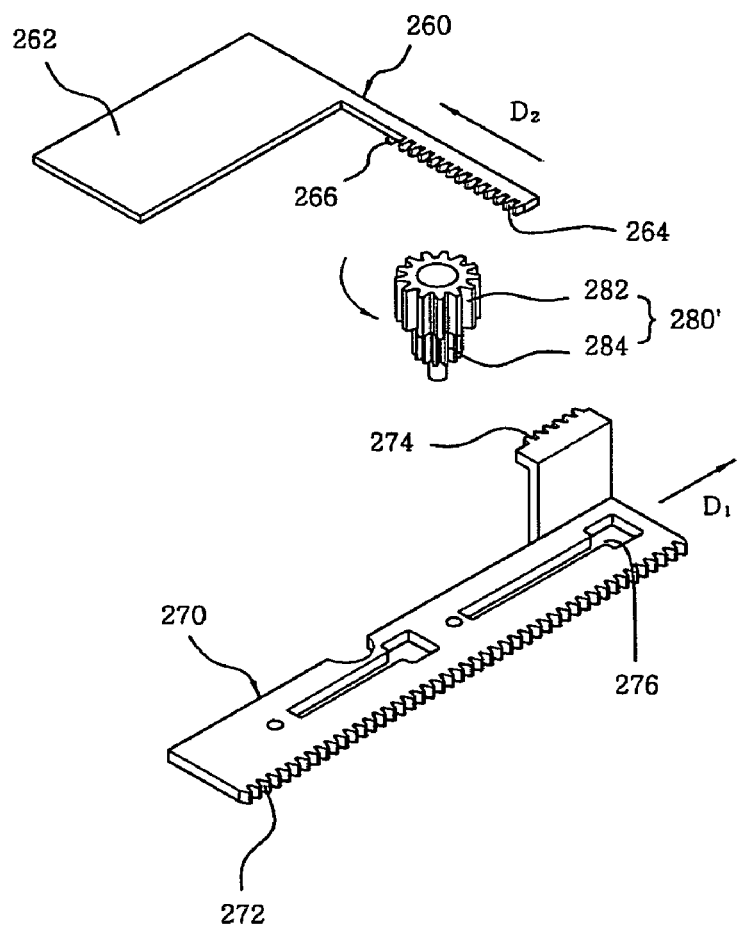
FIG. 7 is an exploded perspective view of an objective lens protective unit of an optical disk apparatus, according to a second embodiment of the present invention.

FIG. 7 is an exploded perspective view of an objective lens protective unit of an optical disk apparatus, according to a second embodiment of the present invention. As shown in FIG. 7, the objective lens protective unit of the optical disk apparatus according to the second embodiment includes a power transmission shaft 280'. The power transmission shaft 280' of the second embodiment comprises two pinion gears 282 and 284 which have different diameters and are layered on top of another, different from the power transmission shaft 280 of the first embodiment. Preferably, the two pinion gears 282 and 284 having different diameters are axially layered on top of another, thus constituting the power transmission shaft 280'. Alternatively, the power transmission shaft 280' may be provided by a structure in that two threads having different heights are provided around one pinion gear at different positions on the pinion gear.

As such, a diameter of the pinion gear 284 corresponding to the second rack 274 of the cover conveying body 270 is different from a diameter of the pinion gear 282 corresponding to the rack 264 of the cover body 260. Therefore, a moving distance $D_1$ of the cover conveying body 270 is different from a moving distance $D_2$ of the cover body 260 while the cover conveying body 270 and the cover body 260 are coupled to each other through the power transmission shaft 280'.

In the case of the second embodiment shown in FIG. 7, the diameter of the pinion gear 282 corresponding to the cover body 260 is larger that the diameter of the pinion gear 284 corresponding to the cover conveying body 270. Thus, the moving distance $D_2$ of the cover body 260 is longer than the moving distance $D_1$ of the cover conveying body 270. Furthermore, a length of the second rack 274 of the cover conveying body 270 is shorter than the length (R; see, FIG. 4) of the second rack 274 of the cover conveying body 270 of the first embodiment.

As such, by controlling the diameters of the pinion gears 282 and 284 constituting the power transmission shaft 280', the moving distance $D_2$ of the cover body 260 relative to the moving distance $D_1$ of the cover conveying body 270 can be controlled. Therefore, the opening and closing operation of the cover 262 are more rapidly executed on the basis of the rotating speed of the drive motor 242. Furthermore, the length of the second rack 274, which is required to control the operation of the cover 262, is shorted.

As such, the optical disk apparatus of the present invention includes the objective lens protective unit in which the cover covers the objective lens when the optical pickup is not used, thus protecting the objective lens from outside dust. Furthermore, the optical disk apparatus of the present invention uses the cover which is operated by the racks, the pinion gear and the existing drive motor to convey the optical pickup. Therefore, the optical disk apparatus can include the objective lens protective unit to cover and uncover the objective lens without being increased in the size.

In addition, the power of the drive motor is transmitted to the cover through the power transmission means comprising the racks and the pinion gear. Therefore, the moving distance of the cover is precisely controlled according to the rotation of the drive motor.

Moreover, the optical disk apparatus of the present invention has a simple structure using the racks and the pinion gear without an additional drive unit, such as a motor for actuating the cover. In other words, the present invention requires only the existing drive motor for conveying the optical pickup to operate the cover. Therefore, the present invention can reduce the number of elements. Furthermore, it is unnecessary to provide a complex control between the two drive motors (the drive motor for conveying the optical pickup and the drive motor for actuating the cover), which was required in a conventional optical pickup apparatus having the drive motor for actuating the cover. Accordingly, the optical disk apparatus of the present invention efficiently controls the opening and closing of the cover in comparison with conventional optical disk apparatuses. In a detailed description, the action times of the cover and the optical pickup is determined by arrangement conditions of the two racks (the rack of the optical pickup conveying body and the first rack of the cover conveying body) which engage with the gear train in conjunction with each other. Therefore, the present invention does not require an additional controlling unit to control the action times of the cover and the optical pickup.

As described above, the present invention provides an optical disk apparatus in which an objective lens protective unit with a power transmission means comprising a rack and a pinion gear is operated by a rotation of a drive motor of an optical pickup actuating unit, so that a cover covers and uncovers an objective lens, thus protecting the objective lens from outside contamination, such as dust. Furthermore, because the objective lens protective unit is operated using a simple combination of the rack and the pinion gear, the optical disk apparatus is prevented from being increased in size. In addition, the cover moves according to the rotation of the drive motor of the optical pickup actuating unit. Therefore, the cover and an optical pickup are intimately coupled to start their movements in a predetermined manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical disk apparatus, comprising:
    a deck with a central hole provided on a central portion of the deck;
    a pair of guide shafts provided on the deck on opposite sides of the central hole;
    a spindle motor provided at a predetermined position on the deck and coupled to a turntable on which an optical disk is placed;
    an optical pickup movably supported at opposite sides thereof by the pair of guide shafts, with an objective lens provided in the optical pickup; and
    an optical pickup actuating unit to reciprocate the optical pickup in a radial direction of the optical disk, and including:
        a drive motor provided on the deck on a predetermined side of the central hole; and
        an optical pickup conveying body coupled at a first surface thereof to the optical pickup and coupled at a second surface thereof to the drive motor through a gear train to move said optical pickup along said pair of guide shafts, wherein said coupling includes a rack-and-pinion member including a first rack attached to a disk reader and having with a first set of rack teeth and a first gear attached to said driving motor to reciprocate said disk reader, the coupling further includes a second rack-and-pinion member with a second rack disposed perpendicularly to the first rack and a second gear engaging said second rack to reciprocate a cover;
    an objective lens protective unit, including a cover to cover the objective lens and being linearly reciprocated by the drive motor in a direction crossing the pair of guide shafts, thus covering and uncovering the objective lens.

2. The optical disk apparatus according to claim 1, wherein the objective lens protective unit comprises:
    a cover conveying body reciprocating in the radial direction of the optical disk in conjunction with the optical pickup conveying body;
    a cover body reciprocating in the direction crossing the pair of guide shafts according to the reciprocating motion of the cover conveying body, said cover body having a cover protruded from an end of the cover body; and
    power transmission means for converting the reciprocating motion of the cover conveying body into the reciprocating motion of the cover body,
    wherein the conversion of the reciprocating motion of the cover conveying body into the reciprocating motion of the cover body is executed in a state in which the optical pickup is stopped at a predetermined position.

3. The optical disk apparatus according to claim 2, wherein the predetermined position, at which the optical pickup is stopped, is a waiting position at which the optical pickup is placed when the optical disk is placed onto or removed from the turntable.

4. The optical disk apparatus according to claim 2, wherein the power transmission means comprises:
    a power transmission shaft having at least one pinion gear; and
    racks provided on each of the cover conveying body and the cover body to engage with the power transmission shaft.

5. The optical disk apparatus according to claim 4, wherein the power transmission shaft is supported on the optical pickup in a direction perpendicular to a surface of the optical disk, and the racks of the cover conveying body and the cover body engage with the power transmission shaft at different positions on the power transmission shaft.

6. The optical disk apparatus according to claim 5, wherein the power transmission shaft comprises two pinion gears which have different diameters and are layered on top of another, so that a moving distance of the cover conveying body is different from a moving distance of the cover body.

7. The optical disk apparatus according to claim 6, wherein the moving distance of the cover body is larger than the moving distance of the cover conveying body.

8. The optical disk apparatus according to claim 4, further comprising:
    a rack provided on a side of the optical pickup conveying body to engage with the gear train; and
    another rack provided on a side of the cover conveying body opposite the rack engaging with the power transmission shaft to engage with the gear train.

9. The optical disk apparatus according to claim 8, wherein the cover conveying body and the optical pickup conveying body start to move by the drive motor at a predetermined time interval.

10. The optical disk apparatus according to claim 9, wherein the racks of the cover conveying body and the optical pickup conveying body which correspond to the gear train have different lengths, and the cover conveying body and the optical pickup conveying body are operated in conjunction with each other by coupling means including a protrusion and a slot.

11. The optical disk apparatus according to claim 10, wherein the rack of the cover conveying body corresponding to the gear train is longer than the rack of the optical pickup conveying body by a predetermined length, and while the optical pickup is placed at the waiting position, the cover conveying body is actuated alone by the gear train, and thereafter, the optical pickup conveying body is actuated along with the cover conveying body by the coupling means.

12. The optical disk apparatus according to claim 11, wherein the rack of the cover conveying body to correspond to the power transmission shaft has a predetermined length and is provided at a predetermined position to correspond to the predetermined length by which the rack of the cover conveying body corresponding to the gear train is longer than the rack of the optical pickup conveying body.

13. The optical disk apparatus of claim 1 wherein said objective lens protective unit is reciprocated in a direction perpendicular to the motion of said optical pickup.

14. The optical disk apparatus of claim 1 wherein said deck has a top surface and said optical pickup and said objective lens protective unit are supported on said top surface.

15. The optical disc apparatus of claim 1 wherein said optical pickup and said objective lens protective unit are disposed between said pair of guide shafts.

16. An optical disk apparatus comprising: a deck:
a pair of guide shafts disposed in parallel and attached to said deck;
a rotatable disk support constructed and arranged to hold an optical disk;
a disk reader assembly movably mounted on said guide shafts and including an optical lens, a lens cover and a lens cover positioning member and a coupling, wherein said coupling includes a first rack-and-pinion member including a first rack attached to said disk reader and having with a first set of rack teeth and said first gear attached to said driving motor to reciprocate said disk reader, the coupling further includes a second rack-and-pinion member with a second rack disposed perpendicularly to the first rack and a second gear engaging said second rack to reciprocate said cover; and
a driving motor engaging said coupling and cooperating with said coupling to operate in one of a first and a second mode;
wherein in said first mode, the disk reader is reciprocated linearly on said guide shafts between a first position in which said lens is positioned to read the optical disk and a second position in which the lens is remote from the disk; and
wherein in said second mode said lens is stationary at said second end and said cover is linearly reciprocated in a direction crossing said guide shafts to cover said lens.

17. The optical disk apparatus of claim 16 wherein said deck is formed with a hole and said rotatable disk support includes a spindle motor, a spindle motor shaft operated by said spindle motor and a turntable supported by said spindle motor shaft above said deck to allow said lens to read the disk.

18. The optical disk apparatus of claim 16 wherein said first rack includes a second set of rack teeth positioned to selectively engage said second gear and turn said second gear once said disk reader reaches said second position.

* * * * *